United States Patent
Castinado et al.

(10) Patent No.: US 11,985,665 B2
(45) Date of Patent: May 14, 2024

(54) SECURE EDGE DEVICE FOR CONTACTLESS VEHICLE PROCESSING

(71) Applicant: BANK OF AMERICA CORPORATION, Charlotte, NC (US)

(72) Inventors: Joseph Benjamin Castinado, North Glenn, CO (US); Naoll Addisu Merdassa, Chakopee, MN (US); Lalit Dhawan, Franklin Park, NJ (US); Robert Nyeland Huggins, Charlotte, NC (US); Pratap Dande, Saint Johns, FL (US); Michael Joseph Carroll, Orland Park, IL (US); Brandon Sloane, Indian Land, SC (US); Vijaya L Vemireddy, Plano, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 54 days.

(21) Appl. No.: 17/345,115

(22) Filed: Jun. 11, 2021

(65) Prior Publication Data

US 2022/0400474 A1 Dec. 15, 2022

(51) Int. Cl.
*H04W 72/20* (2023.01)
*H04W 12/08* (2021.01)
*H04W 72/51* (2023.01)
*H04W 72/563* (2023.01)

(52) U.S. Cl.
CPC ........... *H04W 72/20* (2023.01); *H04W 12/08* (2013.01); *H04W 72/51* (2023.01); *H04W 72/563* (2023.01)

(58) Field of Classification Search
CPC ........... H04W 72/0406; H04W 72/048; H04W 72/06; H04W 12/08; H04W 72/20; H04W 72/51; H04W 72/563
See application file for complete search history.

(56) References Cited

U.S. PATENT DOCUMENTS

| 8,891,419 B2 | 11/2014 | Smadi |
| 9,015,063 B2 | 4/2015 | Fisher |
| 10,853,797 B2 | 12/2020 | Hammad |
| 10,949,830 B1 * | 3/2021 | Gaudin ............. G06Q 20/3226 |
| 10,984,406 B2 | 4/2021 | Laracey |
| 11,055,722 B1 | 7/2021 | Duke |

(Continued)

FOREIGN PATENT DOCUMENTS

| AU | 2019283828 B2 | 7/2021 |
| CN | 103455913 | 12/2013 |

(Continued)

*Primary Examiner* — Wayne H Cai
(74) *Attorney, Agent, or Firm* — Moore & Van Allen PLLC; Lauren M. Stokes

(57) ABSTRACT

Embodiments of the present invention provide a secure edge device for contactless resource distribution and resource crediting from an automobile. In this way, the edge device may be affixed to or embedded within the side or the mirror of an automobile and be able to communicate with a third party device using near field communication. Upon authentication of a user, the edge device may communicate with the third party to transmit and present data about the resource distribution to the automobile display. The system allows for the user to select the resource distribution via the automobile display and provide a completion of resource distributions.

20 Claims, 6 Drawing Sheets

(56) References Cited

U.S. PATENT DOCUMENTS

| | | |
|---|---|---|
| 11,410,156 B2 | 8/2022 | Ding |
| 11,465,586 B1 * | 10/2022 | Lyon ....................... B60R 25/01 |
| 2009/0282130 A1 | 11/2009 | Antoniou |
| 2016/0162879 A1 | 6/2016 | Mu |
| 2017/0061438 A1 * | 3/2017 | Patel .................. G06Q 20/4016 |
| 2017/0061466 A1 | 3/2017 | Srivastava |
| 2018/0053169 A1 | 2/2018 | James |
| 2019/0050634 A1 | 2/2019 | Nerayoff |
| 2019/0172035 A1 | 6/2019 | Cronin |
| 2021/0406856 A1 | 12/2021 | Fisher |
| 2022/0156748 A1 * | 5/2022 | Husain ................. G06Q 20/322 |
| 2023/0019736 A1 | 1/2023 | Gaudin |

FOREIGN PATENT DOCUMENTS

| | | |
|---|---|---|
| CN | 103577982 | 2/2014 |
| CN | 104408620 | 3/2015 |
| CN | 104463575 A | 3/2015 |
| KR | 20210121235 A | 10/2021 |

\* cited by examiner

SECURE EDGE DEVICE FOR CONTACTLESS VEHICLE PROCESSING

BACKGROUND

Manual interactions between users in vehicles and third parties that traditionally involve manual or face-to-face conveyance of data and information that can lead to insecure conveyances of data thereby reducing productivity and security associated with all parties involved. As such, there exists a need for a system to improve the efficiency, speed, and data security of performing interactions.

BRIEF SUMMARY

The following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Embodiments of the present invention provide a secure edge device for contactless resource distribution and resource crediting using the edge device on or associated with an automobile in order to prevent contact with an individual or contact with a card during a resource distribution. In this way, the edge device may be affixed to the side or the mirror of an automobile and be able to communicate with a third party device to complete a transaction using near field communication. In some embodiments, the edge device may be affixed to the automobile. In some embodiments, the edge device may be embedded within the automobile. The edge device may link to a user device, such as a mobile phone, in order to set up the payment vehicles on the edge device.

Once a resource distribution is identified, the edge device may communicate with the third party device, such as a third party point-of-transaction device or the like to receive data about the resource distribution. The edge device may then transmit the data about the resource distribution to the automobile display. This may allow the user to visualize purchase options, confirm resource distributions, confirm resource distribution vehicle for completion of the resource distribution, and authorize the resource distribution. As such, the invention provides for a contactless integration of an edge device into an automobile for completion of resource distributions, such as tolls, drive throughs, parking, meters, gas stations, and the like and for completion of resource crediting, such as returns or the like.

Embodiments of the present invention address the above needs and/or achieve other advantages by providing apparatuses (e.g., a system, computer program product and/or other devices) and methods for an automobile contactless resource distribution, the invention comprising: configuring resource distribution elements, authentication credentials, and restrictions into an integrated secure edge device associated with an automobile; initiating contactless communication between the secure edge device and a third party device for completion of a resource distribution; displaying resource distribution information from the third party device and resource distribution elements from the secure edge device to a display associated with the automobile, wherein the resource distribution information is transmitted from the third party device via the contactless communication between the secure edge device and the third party device to the display associated with the automobile; allowing user authorization of the resource distribution upon authentication and active interaction with the display associated with the automobile; and blocking near field communication with the integrated secure edge device upon completion of the resource distribution.

In some embodiments, displaying resource distribution information from the third party device and resource distribution elements from the secure edge device to a display associated with the automobile, further comprises displaying prompts for use completion of the resource distribution including products, credits, or resource elements to complete resource distribution.

In some embodiments, authentication credentials further comprise matching of user vehicle preferences and confirming co-localization of a user device and an automobile system.

In some embodiments, configuring resource distribution elements further comprises adding payment accounts to the secure edge device to complete resource distributions or credits via contactless transacting using the secure edge device associated with the automobile.

In some embodiments, initiating contactless communication between the secure edge device and the third party device further comprises recognizing a co-location between the secure edge device and the third party device and creating a contactless near field communication linkage between the co-located devices.

In some embodiments, initiating contactless communication between the secure edge device and the third party device is based on a matching of restrictions and a matching of authentication credentials.

In some embodiments, resource distribution elements comprise one or more resource accounts to complete a resource distribution.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
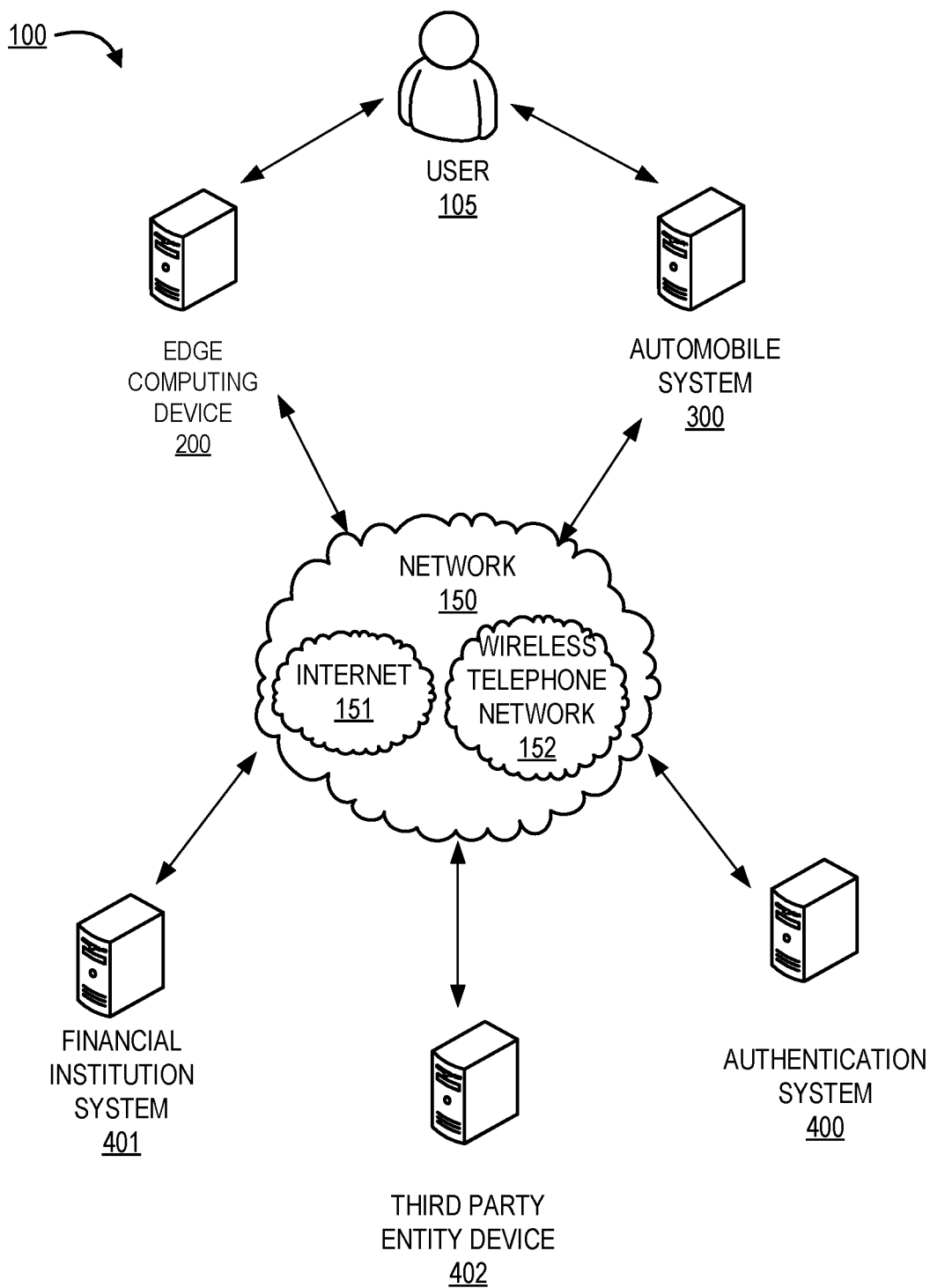
Figure 2:
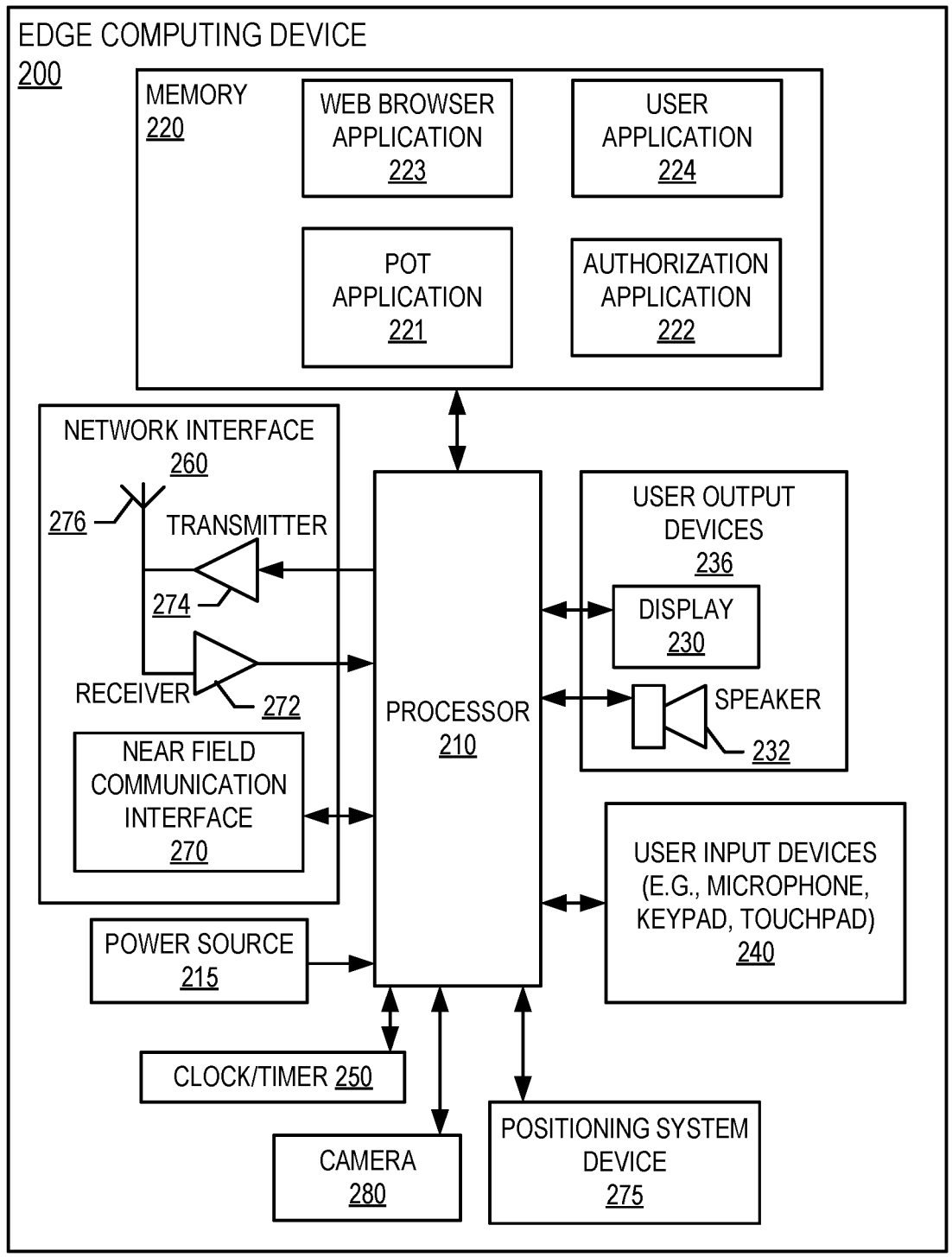
Figure 3:
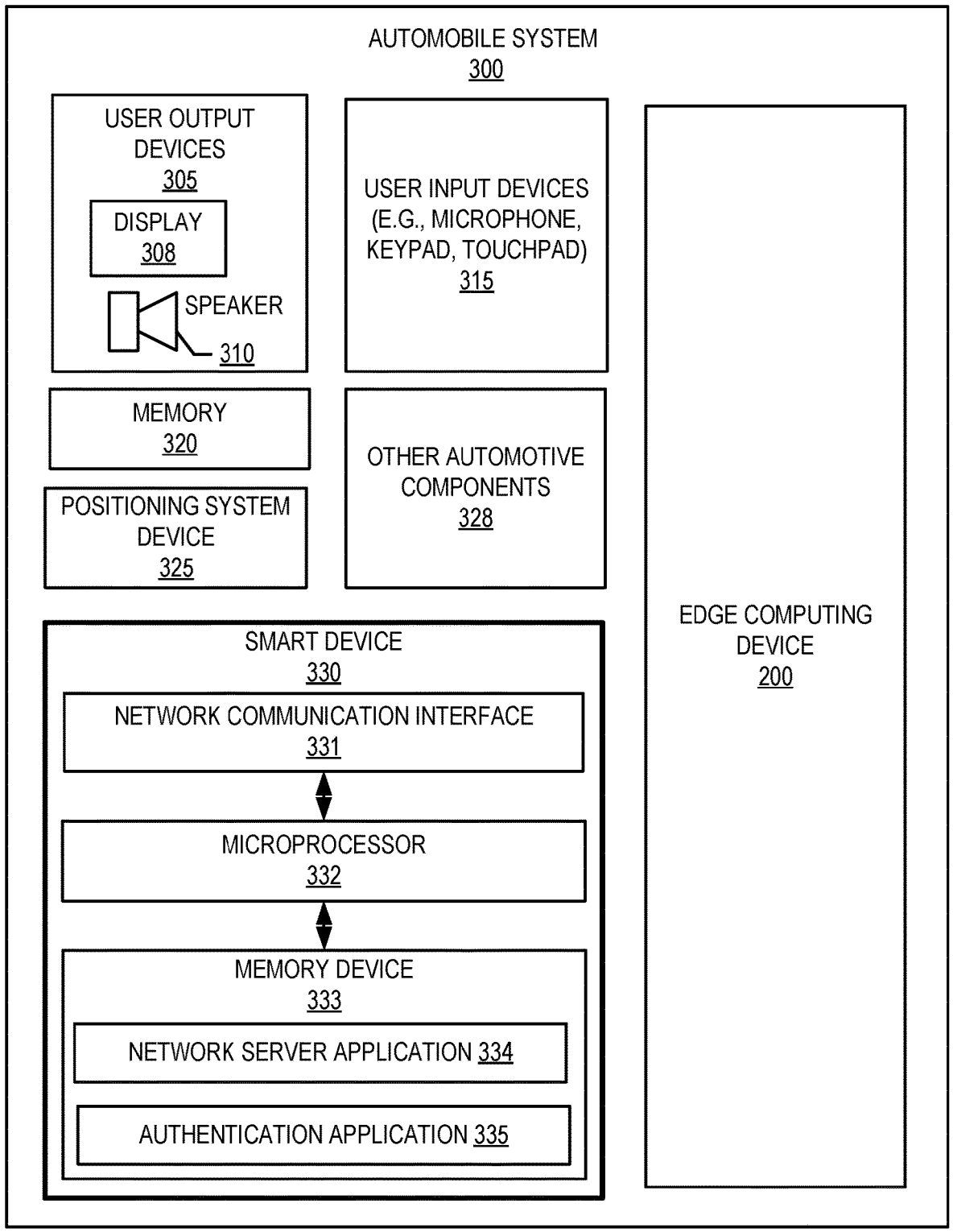
Figure 4:
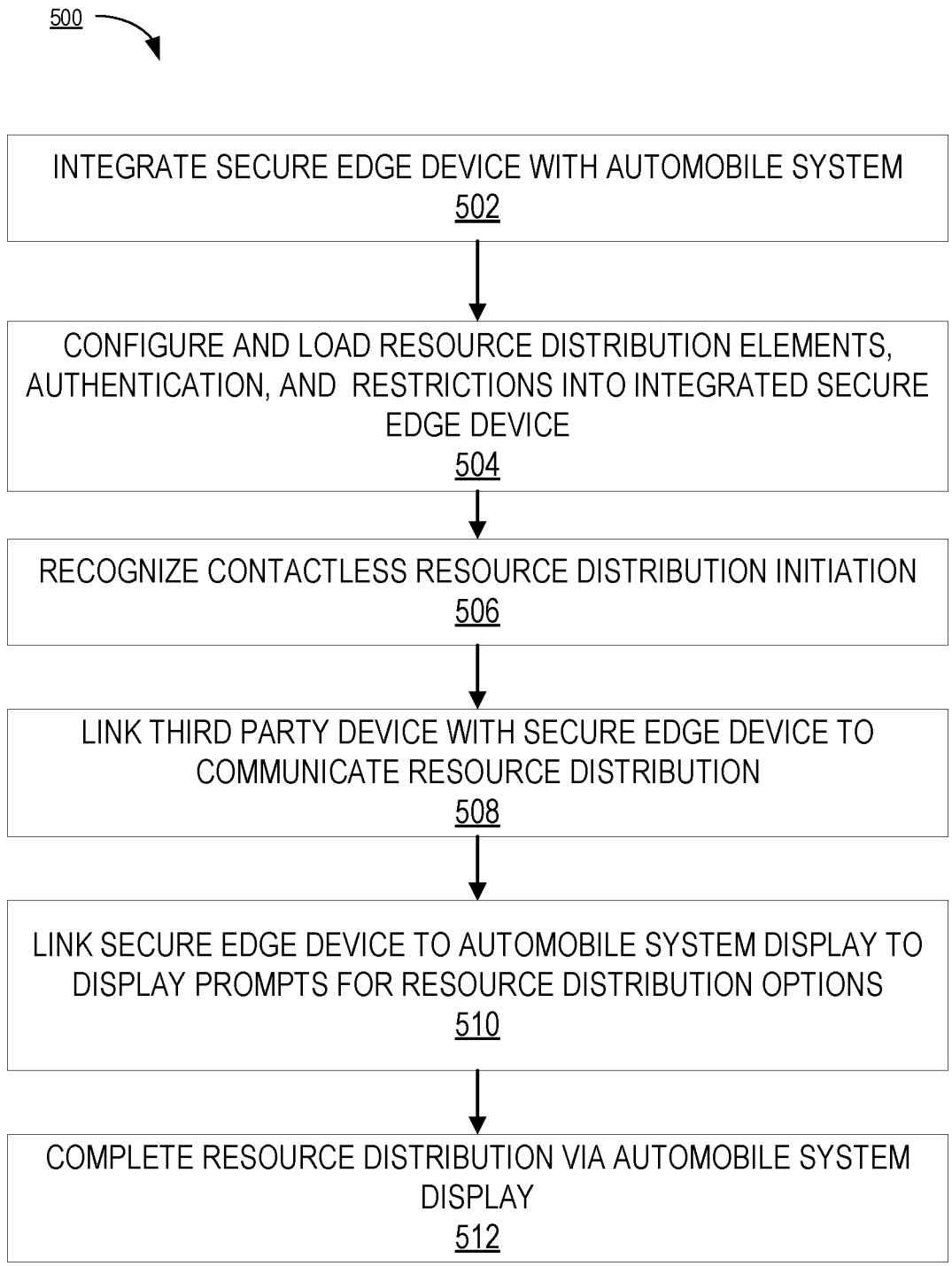
Figure 5:
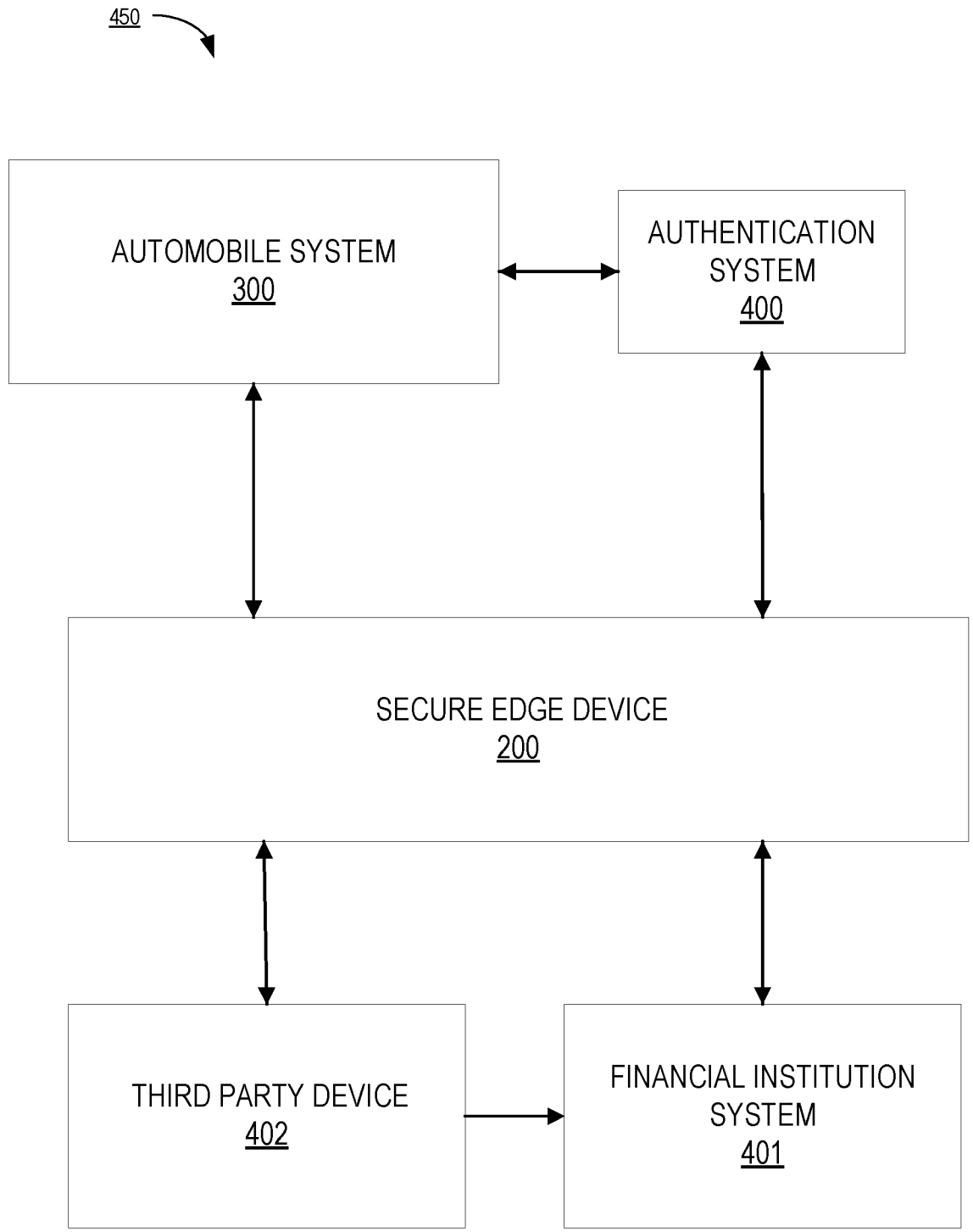
Figure 6:
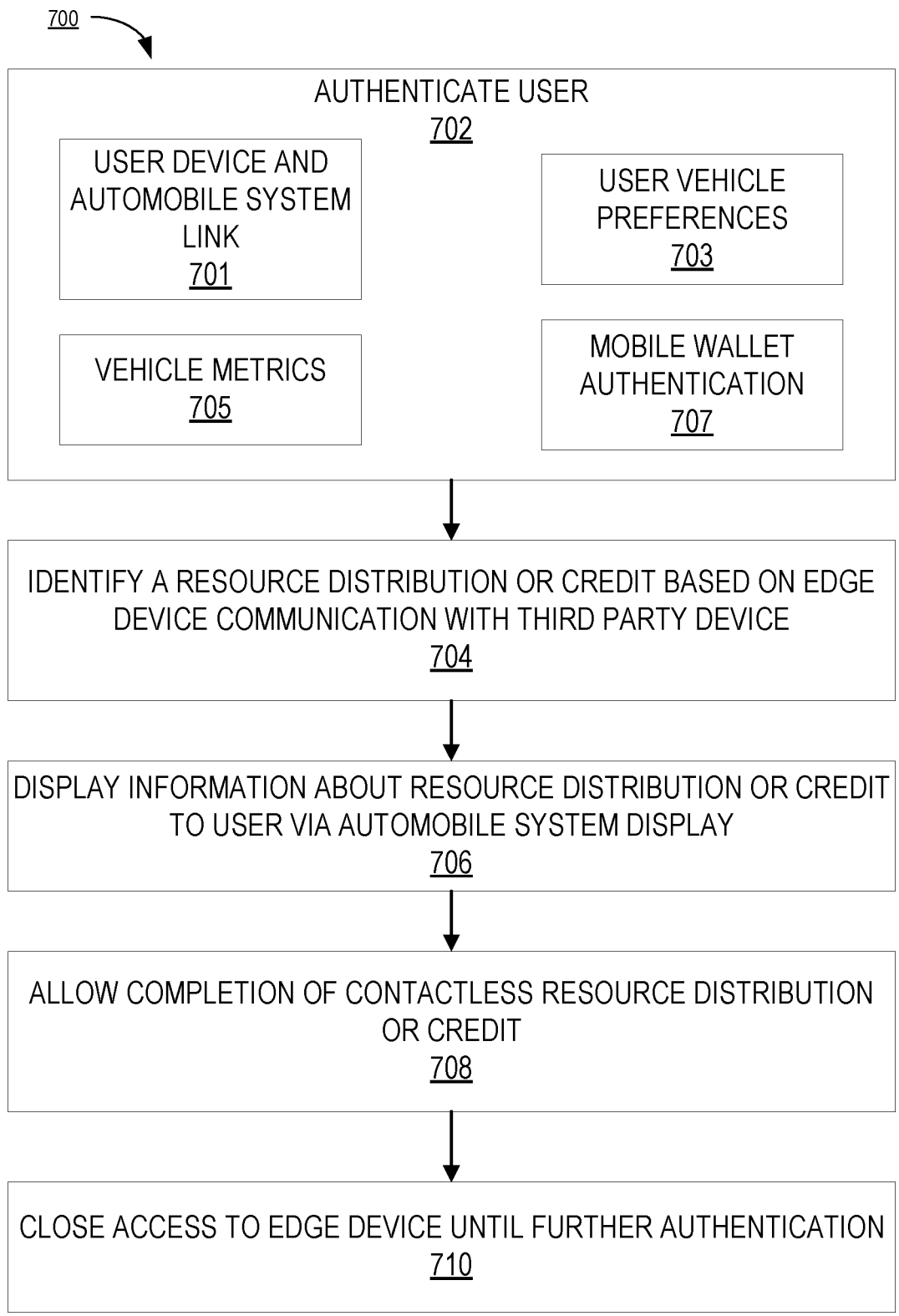

Having thus described embodiments of the invention in general terms, reference will be made to the accompanying drawings, where:

FIG. 1 presents a secure edge device for contactless resource processing system environment, in accordance with an embodiment of the present invention;

FIG. 2 presents a block diagram illustrating a secure edge device, in accordance with an embodiment of the present invention;

FIG. 3 presents a block diagram illustrating an automobile system, in accordance with an embodiment of the present invention;

FIG. 4 presents a process flow for processing a resource distribution using the secure edge device, in accordance with an embodiment of the present invention;

FIG. 5 presents a process flow illustrating system interaction for contactless resource processing, in accordance with an embodiment of the present invention; and FIG. 6 presents a process flow for contactless resource distribution or crediting using the secure edge device, in accordance with an embodiment of the present invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

In some embodiments, an "automobile" or "vehicle" as used herein may refer to any vehicle for transportation of a user from one or more locations. In some embodiments, the term "entity" or "third party" or "third party entity" as used herein may be any merchant offering products or services to one or more users. This may include Quick Service Restaurants (QSR), gas stations, merchants providing parking spaces, toll booths, convenience stores, pharmacy, wholesale merchants, and/or the like. The term "remote device" as used herein may be any computing device utilized by third party entities. The term "third party entity device" may be any computing device provided by third party entities at third party entity locations. This may include point of sale (POS) provided by third party entities at any of the third party locations. In some embodiments, an "authentication location" may be a physical or digital location that may require some sort of authentication or misappropriation protection to gain access. For example, the physical locations may include ATM machines, tollbooths, parking lots, gas stations (fuel payments), resource distributions, or the like. The digital locations may include one or more webpages or mobile device pages that require authentication in order to gain access.

In accordance with embodiments of the invention, an "interaction" may be a transaction, transfer of funds, transfer of resources, credit, and may refer to any activities or communication between a user and a financial institution, between a financial institution and a third party system, activities or communication between multiple financial institutions, communication between technology application and the like. Transfer of resources may refer to a payment, processing of funds, international transfer of funds, purchase of goods or services, a return of goods or services, a payment transaction, a credit transaction, or other interactions involving user's resource or account. Unless specifically limited by the context, a "transaction", a "transfer of funds", a "record" may refer to any activity initiated between a user and a financial institution or a third party system, or any combination thereof. Typical financial transactions include point of sale (POS) transactions, automated teller machine (ATM) transactions, person to person (p2p) transfers, internet transactions, online shopping, electronic funds transfers between accounts, transactions with a financial institution teller, personal electronic checks, conducting purchases using loyalty/reward points, or the like. When discussing the resource transfers or transactions are evaluated it could mean that the transactions have already occurred, are in the process of occurring or being processed, or they have yet to be processed/posted by one or more financial institutions.

A "system environment", as used herein, may refer to any information technology platform of an enterprise (e.g., a national or multi-national corporation) and may include a multitude of servers, machines, mainframes, personal computers, network devices, front and back end systems, database system and/or the like.

Embodiments of the present invention provide a secure edge device for contactless resource distribution and resource crediting using the edge device on or associated with an automobile in order to prevent contact with an individual or contact with a card during a resource distribution. In this way, the edge device may be affixed to the side or the mirror of an automobile and be able to communicate with a third party device to complete a transaction using near field communication. In some embodiments, the edge device may be affixed to the automobile. In some embodiments, the edge device may be embedded within the automobile. The edge device may link to a user device, such as a mobile phone, in order to set up the payment vehicles on the edge device.

Once a resource distribution is identified, the edge device may communicate with the third party device, such as a third party point-of-transaction device or the like to receive data about the resource distribution. The edge device may then transmit the data about the resource distribution to the automobile display. This may allow the user to visualize purchase options, confirm resource distributions, confirm resource distribution vehicle for completion of the resource distribution, and authorize the resource distribution. As such, the invention provides for a contactless integration of an edge device into an automobile for completion of resource distributions, such as tolls, drive throughs, parking, meters, gas stations, and the like and for completion of resource crediting, such as returns or the like.

FIG. 1 illustrates a secure edge device for contactless resource processing system environment 100, in accordance with an embodiment of the present invention. As depicted in FIG. 1, the operating environment 100 may include an authentication system 400 interacting with an edge computing device 200 and automobile system 300 of a user 105, one or more financial institution system 401, one or more third party entity devices 402, using a network 150 that includes an internet 151 and wireless telephone network 152. In such an embodiment, the authentication system 400 communicates with a financial institution system 401 to complete one or more interactions. In some embodiments, the authentication system 400 may be a part of a financial institution system 401. In alternate embodiments, the authentication system 400 may be a part of the automobile system 300. In some embodiments, the authentication system 400 may be part of a smart chip which is placed in the automobile system 300. In some embodiments, the authentication system 400 may interact with the edge computing device 200 and automobiles associated with a plurality of users (not shown) at any given instance. The user 105 may be an individual associated with or owning a vehicle with an automobile system 300 and an edge computing device 200.

The environment 100 also may include an edge computing device 200 of the user 105. The edge computing device 200 may include any machine, apparatus, system or the like that may be connected to and communicate with other devices over a network 150. As used herein the edge computing device 200 may be a stand-alone device that may be affixed to or otherwise removably attached to an automobile. In some embodiments the edge computing device 200 may be integrated within the automobile. The edge computing device 200 may be connected to a network by wireless access such as wireless local area network (WLAN) such as Wi-Fi based on the Institute of Electrical and Electronics Engineers' (IEEE) 802.11 standards, Bluetooth short-wavelength UHF radio waves in the ISM band from 2.4 to 2.485 GHz or other wireless access technology. The edge computing device 200 may also have the ability to perform and complete transactions similar to a point-of-transaction device using near field communication or other contactless means for completing a resource distribution.

Referring now to FIG. 2, the edge computing device 200 may be associated with the automobile of the user 105. In some embodiments, the edge computing device 200 may be a stand alone device that is affixed to the automobile. In other embodiments, the edge computing device 200 may be a computer chip or device integrated within the automobile.

Some embodiments of the edge computing device 200 include a processor 210 communicably coupled to such devices as a memory 220, user output devices 236, user input devices 240, and a network interface 260. The edge computing device 200 further includes a power source 215, such as a battery or means for extracting power from the automobile for powering various circuits and other devices that are used to operate the edge computing device 200. Embodiments of the edge computing device 200 may also include a clock or other timer 250 configured to determine and, in some cases, communicate actual or relative time to the processor 210 or one or more other devices. The processor 210, and other processing devices described herein, generally include circuitry for implementing communication and/or logic functions of the associated device. For example, the processor 210 may include a digital signal processor device, a microprocessor device, and various analog to digital converters, digital to analog converters, and/or other support circuits. Control and signal processing functions of the edge computing device 200 are allocated between these devices according to their respective capabilities. The processor 210 thus may also include the functionality to encode and interleave messages and data prior to modulation and transmission. The processor 210 can additionally include an internal data modem. Further, the processor 210 may include functionality to operate one or more software programs, which may be stored in the memory 220. For example, the processor 210 may be capable of operating a connectivity program, such as a web browser application 223 or a third party display and project it on to an automobile display screen. The web browser application 223 may then allow the edge computing device 200 to transmit and receive web content, such as, for example, location-based content and/or other web page content, according to a Wireless Application Protocol (WAP), Hypertext Transfer Protocol (HTTP), and/or the like. The memory device 220 may include other applications such as a point of transaction (POT) application 221, a user application 224, authorization application 222, and/or the like. The user application 224 may be a digital wallet application or any application that maintains virtual cards which is provided by an entity system. In some embodiments, POT application 221 may be a mobile banking application that can communicate with third party point of transaction devices in order to initiate communication and completion of a transaction using contactless methods such as near field communication. In some embodiments, the authorization application 222 allows the edge computing device 200 to interact with entity systems and authentication system 400.

The processor 210 is configured to use the network interface 260 to communicate with one or more other devices on the network 150. In this regard, the network interface 260 includes an antenna 276 operatively coupled to a transmitter 274 and a receiver 272 (together a "transceiver"). The processor 210 is configured to provide signals to and receive signals from the transmitter 274 and receiver 272, respectively. The signals may include signaling information in accordance with the air interface standard of the applicable cellular system of the wireless telephone network 152 or near field communication linkage. In this regard, the edge computing device 200 may be configured to operate with one or more air interface standards, communication protocols, modulation types, and access types. By way of illustration, the edge computing device 200 may be configured to operate in accordance with any of a number of first, second, third, and/or fourth-generation communication protocols and/or the like. For example, the edge computing device 200 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Consolidated Mobile Telecommunications System (UMTS), CDMA2000, wideband CDMA (WCDMA) and/or time division-synchronous CDMA (TD-SCDMA), with fourth-generation (4G) wireless communication protocols, with LTE protocols, with 3GPP protocols and/or the like. The edge computing device 200 may also be configured to operate in accordance with non-cellular communication mechanisms, such as via a wireless local area network (WLAN), near field communications, or other communication/data networks.

The network interface 260 may also include a near field communication (NFC) interface 270. As used herein, the phrase "NFC interface" generally refers to hardware and/or software that is configured to contactlessly and/or wirelessly send and/or receive information over relatively short ranges (e.g., within four inches, within three feet, within fifteen feet, and the like). The NFC interface 270 may include a smart card, key card, proximity card, Bluetooth® device, radio frequency identification (RFID) tag and/or reader, transmitter, receiver, and/or the like. In some embodiments, the NFC interface 270 communicates information via radio, infrared (IR), and/or optical transmissions. In some embodiments, the NFC interface 270 is configured to operate as an NFC transmitter and/or as an NFC receiver (e.g., an NFC reader). Also, it will be understood that the NFC interface 270 may be embedded, built, carried, and/or otherwise supported in and/or on the edge computing device 200. In some embodiments, the NFC interface 270 is not supported in and/or on the edge computing device 200, but the NFC interface 270 is otherwise operatively connected to the edge computing device 200 (e.g., where the NFC interface 270 is a peripheral device plugged into the edge computing device 200). Other apparatuses having NFC interfaces mentioned herein may be configured similarly. In some embodiments, the NFC interface 270 of the edge computing device 200 is configured to contactlessly and/or wirelessly communicate information to and/or from a corresponding NFC interface of another apparatus (e.g., a point of sale (POS) device, an automated teller machine (ATM) or another mobile or computing device, a third party device, or the like). In one embodiment of the present invention, the NFC interface of the edge computing device 200 wirelessly communicates information (virtual card information such as virtual card number, CVV code, expiration date) stored in the user application 224 to perform a contactless transaction.

As described above, the edge computing device 200 has a user interface that may be made up of user output devices 236 and/or user input devices 240. The user output devices 236 include a display 230 (e.g., a liquid crystal display or the like) and a speaker 232 or other audio device, which are operatively coupled to the processor 210 and may be part of the automobile, such as an integration into the display of the automobile dashboard, center console, steering wheel, or the like. The user input devices 240, which allow the edge computing device 200 to transmit data, may include any of a number of devices allowing the edge computing device 200 to transmit data, such as a keypad, keyboard, touchscreen, touchpad, microphone, mouse, joystick, other pointer device, button, soft key, and/or other input device(s). The user interface may also include a camera 280, such as a digital camera.

The edge computing device 200 may also include a positioning system device 275 that is configured to be used by a positioning system to determine a location of the edge computing device 200. For example, the positioning system device 275 may include a GPS transceiver. In some embodiments, the positioning system device 275 is at least partially made up of the antenna 276, transmitter 274, and receiver 272 described above. For example, in one embodiment, triangulation of cellular signals may be used to identify the approximate location of the edge computing device 200. In other embodiments, the positioning system device 275 includes a proximity sensor or transmitter, such as an RFID tag, that can sense or be sensed by devices known to be located proximate a location to determine that the edge computing device 200 is located proximate these known devices.

The memory 220 is operatively coupled to the processor 210. As used herein, "memory" or "memory device" includes any computer readable medium (as defined herein below) configured to store data, code, or other information. The memory 220 may include volatile memory, such as volatile Random Access Memory (RAM) including a cache area for the temporary storage of data. The memory 220 may also include non-volatile memory, which can be embedded and/or may be removable. The non-volatile memory can additionally or alternatively include an electrically erasable programmable read-only memory (EEPROM), flash memory or the like. The memory 220 can store any of a number of applications which include computer-executable instructions/code executed by the processor 210 to implement the functions of the edge computing device 200 and/or one or more of the process/method steps described herein.

These applications also typically provide a graphical user interface (GUI) on the display 230 that allows the user 105 to communicate with the edge computing device 200 to other devices or systems on the network. The memory 220 can also store any of a number of pieces of information, and data, used by the edge computing device 200 and the applications and devices that make up the edge computing device 200 or are in communication with the edge computing device 200 to implement the functions of the edge computing device 200 and/or the other systems described herein. For example, the memory 220 may include such data as user authentication information.

Referring now to FIG. 3, the automobile system 300 comprises one or more components of an automobile. The automobile may be any type of vehicle, such as a car, truck, van, all-terrain vehicle, boat, plane, motorcycle, or the like and may comprise user output devices 305, user input devices 315, memory 320, positioning system device 325, other automotive components, and a smart device 330. In some embodiments, the smart device 330 may be a smart chip. The smart chip may be a micro device in the automobile. In embodiments of the invention, the smart chip 330 is provided by a third party entity, such as a financial institution. The smart chip 330 may be integrated into any vehicle system components and comprise with user input and output devices. In some embodiments, the smart chip is maintained by a third party entity. As shown in the FIG. 3, the smart chip 330 may include a network communication interface 331, microprocessor 332, and memory device 333. The microprocessor 332 is configured to use the network communication interface 331 to communicate with one or more other devices on the network 150. In this regard, the network communication interface 331 may include an antenna operatively coupled to a transmitter and a receiver (together a "transceiver"). In some embodiments, the smart chip 330 may utilize a transceiver of the automobile. The microprocessor 332 is configured to provide signals to and receive signals from the transmitter and receiver, respectively. The smart chip 330 may utilize wireless network including satellite or any other wireless network of the automobile to provide signals and receive signals. In some embodiments, the smart chip 330 may utilize wireless network of the edge computing device 200 connected to the automobile system 300 to provide signals and receive signals to perform one or more steps in the process flows described below. The smart chip 330 may be configured to raise certain triggers and alert the resource distribution triggering system upon occurrence on any of one or more conditions. For example, the smart chip may identify an input from a user via any of the user input devices, such as an edge computing device 200 of the user, and may alert the system. In one example, the smart chip may identify that the user has entered a destination location via the user input devices and alerts the system to trigger processes.

The network communication interface 331 may also include a near field communication (NFC) interface. As used herein, the phrase "NFC interface" generally refers to hardware and/or software that is configured to contactlessly and/or wirelessly send and/or receive information over relatively short ranges (e.g., within four inches, within three feet, within fifteen feet, and the like). The NFC interface may include a smart card, key card, proximity card, Bluetooth® device, radio frequency identification (RFID) tag and/or reader, transmitter, receiver, and/or the like. In some embodiments, the NFC interface communicates information via radio, infrared (IR), and/or optical transmissions. In some embodiments, the NFC interface is configured to operate as an NFC transmitter and/or as an NFC receiver (e.g., an NFC reader). Also, it will be understood that the NFC interface may be embedded, built, carried, and/or otherwise supported in and/or on the edge computing device 200. In some embodiments, the NFC interface is not supported in and/or on the edge computing device 200, but the NFC interface is otherwise operatively connected to the edge computing device 200. For example, edge computing device 200 may be internally connected to the electronic and communication system of the automobile and may utilize the NFC interface of the automobile. In some embodiments, the NFC interface of the edge computing device 200 is configured to contactlessly and/or wirelessly communicate information to and/or from a corresponding NFC interface of another apparatus (e.g., a point of sale (POS) device, an automated teller machine (ATM) or another mobile, remote device, third party entity devices, or computing device). In one embodiment of the present invention, the NFC interface of the edge computing device 200 wirelessly communicates information (virtual card information such as virtual card number, CVV code, expiration date) stored in the memory 320 of the automobile or user application 224 of the edge computing device 200 to and/or from a corresponding NFC interface.

The memory device 333 may include one or more applications or information accessed or received by the smart chip 330. The memory device, as shown, comprises one or more applications including a network server application 334, authentication application 335 and/or the like. The network server application 334 may be configured to cause the microprocessor to interact with other components of the automobile, edge computing device 200, authentication system 400, remote device 401, third party entity device 402, and/or other device associated with the network 150. The authentication application may be utilized in conjunction with the authentication system 400 to perform one or more steps in the process flow described herein for user authentication. The smart chip 330 may receive instructions from the resource distribution triggering system to perform one or more steps described herein. In some embodiments, the smart chip 330 may receive information from the authentication system 400, the third party entity device 402, or the remote device 401 and communicate the information to the user 105 utilizing the user output devices 305 including, but not limited to, display 308 and speaker 310 of the automobile 300. In some embodiments, the smart chip 330 may receive information from the user 105 via the user input devices including, but not limited to, microphone, keypad, touchpad, and/or the like of the automobile and communicate the information received form the user to the authentication system 400, the third party entity device 402, or the remote device 401 to perform one or more steps in the process flows described herein. In some embodiments of the present invention, the smart chip 330 may identify current location of the automobile utilizing the positioning system device 325 of the automobile. In some other embodiments, the smart chip 330 may utilize other automotive components 328 or information available in the other automotive components 328 of the automobile. The automotive components, may include any body and main parts, electrical and electronics (including navigation system, gauges and meters, sensors, electrical switches, cameras, audio/video devices, and/or the like), interior components (car seats, floor components, and/or the like), power train and chassis, and/or the like. In some embodiments, the automobile further comprises a chip reader to facilitate completion of one or more interactions. In some embodiments, the system comprises any other built in mechanism to facilitate completion of one or more interactions. All or some components of the automobile described above may be considered as an automobile system.

In some embodiments, the automobile system 300 may have the edge computing device 200 integrated within the components of the automobile. As such, the edge computing device 200 that is further described above with respect to FIG. 2 may be completely integrated into the body of the automobile, such as within a rearview mirror, body panel, or the like.

FIG. 4 presents a process flow for processing a resource distribution using the secure edge device 500, in accordance with an embodiment of the present invention. As illustrated in block 502, the process 500 is initiated by integrating the secure edge device with the automobile system. In this way, the secure edge device generates a communicable linkage with the automotive systems in order to allow for contactless processing of a transaction. Next, as illustrated in block 504, the process 500 continues by configuring and loading resource distribution elements, authentication criteria, and restrictions into the integrated edge device. The resource distribution elements may include resource distribution vehicles, such as credit cards, debit cards, loyalty accounts, gift cards, or the like loaded onto the edge device in a manner similar to that of loading a digital wallet with credit cards or other resource distribution elements. The restrictions may include mobile wallet restrictions on an amount, location, merchant, geo-fencing, or other user preferences or restrictions associated with the resource distributions.

The system may then identify a user being associated with a vehicle. The system may identify a user being associated with a vehicle based on a generation of a communicable linkage between the user device and the automobile system. In this way, the user device may link with a portion of the automobile system via near field communication channels for linkage of a phone book, maps, text communications, voice communications, or the like. In some embodiments, the system may recognize the user being associated with a vehicle based on biometric touch of the user to the vehicle. In some embodiments, the system may recognize the user being associated with the vehicle based on the key fob used to access and start the vehicle in combination with one or more vehicle adjustments, such as seat adjustments, climate adjustments, radio adjustments, or the like. The process may continue by co-locating the user device with the automobile system. In this way, if the way the system identified the user being associated with the vehicle was not with the user device, the system may track and identify a location of the user device relative to the vehicle. In some embodiments, the system may identify the user device being within or co-located to the vehicle. In this case the invention includes that as another element in the multi factor authentication as identify the user as being authenticated. In other embodiments, the system may identify the user device not being within or co-located to the vehicle. In this case, the system may still authenticate the user, but it may be a softer authentication than if the user device was co-located to the automobile system.

As illustrated in block 506, the process 500 continues by recognized a contactless resource distribution initiation between the user and a merchant based on communication between the edge device associated with the automobile and a merchant device, such as a point-of-transaction device.

The process 500 then continues by authenticating the user. As such, the system generates an initial authentication of the user in association with the vehicle. In this way, the system may co-locate the user device with the automobile system and/or identify the user associated with the vehicle based on the key fob used to access and start the vehicle in combination with one or more vehicle adjustments, such as seat adjustments, climate adjustments, radio adjustments, or the like. This authentication may further be determined based on the initial authentication of the user with the vehicle and any identified additional authentication of the user within the vehicle via various sources including the automobile system, user device, or third party devices. The additional authentication of the user associated with the vehicle may include identification of the user preferences within the vehicle, user device co-locations, and/or third party system authentication.

In some embodiments, the user preferences may include user preferences within the vehicle, such as climate, mirror adjustments, seat adjustments, radio stations, driving styles, additional vehicle settings, and the like. In some embodiments, the user device co-location may include the automotive system identifying a device of the user within a near field communication range, such as in the vehicle of the user or the like. The user may link his/her user device with the automobile system calendar access, phone book access, applications, and the like. As such, after initial linkage, the user device and automobile system may link each time the user device is co-located within the vehicle and may communicate the linkage to the system. The third party systems may include user accessing a third party application that may require user authentication, such as the user device, mobile banking applications, music applications, map applications, and the like. The system may identify the user in the vehicle and accessing user specific third party applications, such as those requiring user authentication. In this way, the system may determine that the user is in the vehicle and a confidence that it is the user based on user accessing applications or the mobile device that may require passwords for authentication into the device or application. In some embodiments, the authentication of the user may be one or more of the additional authentications. In this way, the system provides a layered authentication environment for initial authentication and continued higher authentication development across a continuum based on the additional authentications.

Next, as illustrated in block 508, the process 500 continues by linking the third party device with the secure edge device to communicate the resource distribution, credit, or transaction. In this way, the system allows for the third party device to communicate with the secure edge device via near field communication. The third party device may be able to transmit information about the resource distribution for the user to see the products/services selected or to be selected, a resource amount, resource vehicles to satisfy the resource amount, and the like. As illustrated in block 510, the process continues by linking the secure edge device to the automobile system display in order to display the resource distribution information including any prompts for resource distribution options. The display may be provided with and appear like the third party display, but on the automobile display. The resource distribution options may include products/services associated with the transaction, products to purchase, one or more resource distribution vehicles to use to complete the transaction, and the like.

Finally, as illustrated in block 512, the process 500 is completed by completing the resource distribution via the automobile display. In this way, the use can select options for purchasing and completing the resource distribution via the automobile display and transmit the resource distribution via the edge device for completion of a transaction in a contactless manner.

In some embodiments, the user may be at a drive through window. The system may present different purchase options, such as different meal options, if the drive through is a restaurant. The user may be able to select a meal and provide a credit card using the automobile display. The edge device will transmit the selection and payment to the restaurant for completion of the purchase in a contactless manner.

In some embodiments, the user may be at a gas station. The system may present different purchase options, such as different octans, beverages, or the like available at the gas station. The user may be able to select the amount and octan of gas and provide a credit card using the automobile display. The edge device will transmit the selection and payment to the gas station for completion of the purchase in a contactless manner.

In some embodiments, the user may be parking or driving through a toll. The system may present different purchase options, such as different durations of parking or amounts of the toll. The user may be able to select the amount and provide a credit card using the automobile display. The edge device will transmit the selection and payment to the attendant for completion of the purchase in a contactless manner.

FIG. 5 presents a process flow for illustrating system interactions for contactless resource processing 450, in accordance with an embodiment for the present invention. The secure edge device 200 is either associated with, connected to, or integral to the automobile system 300. The automobile system 300 and the secure edge device 200 communicate with the authentication system 400 in order to authenticate the user to the user's mobile wallet or other digital resource distribution elements in order to complete a contactless transaction with a third party.

Next, the secure edge device 200 is able to communicate with the third party device 402 in order to complete a contactless transaction. The secure edge device 200 and the third party device 402 are then both in communication with the financial institution system 401 in order to process the resource distribution for completion of the contactless resource distribution.

FIG. 6 presents a process flow for contactless resource distribution or crediting using the secure edge device 700, in accordance with an embodiment of the present invention. As illustrated in block 702, the process 700 is initiated by authenticating the user within a vehicle associated with the user. The user may be authenticated via communicable linkage between the automobile system and the user device 701, user vehicle preferences 703, vehicle metrics 705, and mobile wallet authentication 707. As illustrated in block 701, in some embodiments, the user device co-location may include the automotive system identifying a smart computing device of the user within a near field communication range, such as in the vehicle of the user or the like. The user may link his/her user device with the automobile system calendar access, phone book access, applications, and the like. As such, after initial linkage, the user device and automobile system may link each time the user device is co-located within the vehicle and may communicate the linkage to the system. This linkage will activate the edge device for resource distribution. As illustrated in block 703, in some embodiments, the user preferences may include user preferences within the vehicle, such as climate, mirror adjustments, seat adjustments, radio stations, driving styles, additional vehicle settings, and the like. As illustrated in block 705, in some embodiments, metrics may include automobile system metrics linked to the system. As illustrated in block 707, in some embodiments, the edge device may be authenticated based on the user authentication into their mobile wallet.

As illustrated in block 704, the process 700 continues by identifying a resource distribution or a credit being initiated based on authenticated edge device communication with a third party device. In this way, the edge device may communicate with one or more third party devices or remote devices near the vehicle to identify the vehicle coming near or close to the third party associated with the third party device or remote device.

As illustrated in block 706, the process 700 continues by displaying information about resource distribution or resource credit to the user via the automobile system display. In some embodiments, the information about the resource distribution or resource credit may be displayed via the automobile system display. In some embodiments, the information about the resource distribution or resource credit may be displayed via a user device display. In this way, the system may provide the user with information, presented in the third party display format, about the resource distribution or resource credit via the screen on the automobile. Using the screen on the automobile, the user may be allowed to complete the contactless resource distribution or resource credit by selecting products, selecting resource distribution elements, accounts, or the like, as illustrated in block 708.

The amount of the transaction may be based on the number of individuals in the automobile, a duration of time the automobile was in a location, the speed of the automobile, the time of day/night the automobile was transacting, or the like. In this way, the system may allow for smart resource distributing based on these factors to accurately parse a correct resource distribution amount based on these factors.

Once the resource distribution or resource credit has been completed, the system closes access to the edge device until further authentication is provided by the user, as illustrated in block 710. In this way, the system provides a bag around the edge device in order to prevent misappropriation of the edge device and the accounts linked to the device.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for automobile contactless resource distribution, the system comprising:
   one or more memory devices having computer readable code stored thereon;
   one or more processing devices operatively coupled to the one or more memory devices,
   wherein the one or more processing devices are configured to execute the computer readable code to:
      configure resource distribution elements, authentication credentials, and restrictions into an integrated secure edge device associated with an automobile, wherein the integrated secure edge device associated with an automobile is within the automobile and generates a communication linkage between an automobile system and a third party device;
      identify a user co-located with the automobile system based on a communicable linkage between the automobile and a user device and at least one user automobile preference within the automobile,
         wherein the communicable linkage is based on a co-localization of the user device with the automobile, and
         wherein the at least one user automobile preference comprise at least one user specific vehicle adjustment comprising a seat adjustment, a climate adjustment, a mirror adjustment, or a radio adjustment;
      authenticate the user co-located with the automobile system as an authenticated user based on the communicable linkage with the user device comprising an authenticated user device and based on the at least one user automobile preference matching at least one authenticated user automobile preference for the user co-located within the automobile;
      initiate contactless communication between the automobile system via the integrated secure edge device and a third party device for completion of a resource distribution;
      display resource distribution information from the third party device and resource distribution elements from the integrated secure edge device to a display associated with the automobile system, wherein the resource distribution information is transmitted from the third party device via the contactless communication between the integrated secure edge device and the third party device to the display associated with an automobile;
      allow user authorization of the resource distribution upon authentication and active interaction with the display associated with the automobile; and
      block near field communication with the integrated secure edge device upon completion of the resource distribution.

2. The system of claim 1, wherein displaying resource distribution information from the third party device and resource distribution elements from the integrated secure edge device to a display associated with the automobile, further comprises displaying prompts for user completion of the resource distribution including products, credits, and resource elements to complete resource distribution, and wherein the resource distribution information is displayed and appears similar to a third party display on the automobile display.

3. The system of claim 1, wherein configuring resource distribution elements further comprises adding payment accounts to the integrated secure edge device to complete resource distributions or credits via contactless transacting using the integrated secure edge device associated with the automobile.

4. The system of claim 1, wherein initiating contactless communication between the integrated secure edge device and the third party device further comprises recognizing a co-location between the integrated secure edge device and the third party device and creating a contactless near field communication linkage between the co-located devices.

5. The system of claim 1, wherein initiating contactless communication between the integrated secure edge device and the third party device is based on a matching of restrictions and a matching of authentication credentials.

6. The system of claim 1, wherein resource distribution elements comprise one or more resource accounts to complete a resource distribution.

7. The system of claim 1, wherein the integrated secure edge device is affixed to a side mirror of the automobile.

8. The system of claim 1, wherein the user co-located with the automobile is authenticated as an authenticated user further comprises authenticating the user co-located with the automobile based on a third party system authentication, wherein the user co-located with the automobile accesses a third party application requiring authentication.

9. The system of claim 1, wherein the restrictions comprise at least one of a mobile wallet restriction of an amount, location, merchant, or geo-fencing.

10. A computer program product for automobile contactless resource distribution, the computer program product comprising at least one non-transitory computer-readable medium having computer-readable program code portions embodied therein, the computer-readable program code portions comprising:
   an executable portion configured for configuring resource distribution elements, authentication credentials, and restrictions into an integrated secure edge device associated with an automobile, wherein the integrated secure edge device associated with an automobile is within the automobile and generates a communication linkage between an automobile system and a third party device;
   an executable portion configured for identifying a user co-located with the automobile system based on a communicable linkage between the automobile and a user device and at least one user automobile preference within the automobile,
      wherein the communicable linkage is based on a co-localization of the user device with the automobile, and
      wherein the at least one user automobile preference comprise at least one user specific vehicle adjustment comprising a seat adjustment, a climate adjustment, a mirror adjustment, or a radio adjustment;
   an executable portion configured for authenticating the user co-located with the automobile system as an authenticated user based on the communicable linkage with the user device comprising an authenticated user device and based on the at least one user automobile preference matching at least one authenticated user automobile preference for the user co-located within the automobile;

an executable portion configured for initiating contactless communication between the automobile system via the integrated secure edge device and a third party device for completion of a resource distribution;

an executable portion configured for displaying resource distribution information from the third party device and resource distribution elements from the integrated secure edge device to a display associated with the automobile system, wherein the resource distribution information is transmitted from the third party device via the contactless communication between the integrated secure edge device and the third party device to the display associated with an automobile;

an executable portion configured for allowing user authorization of the resource distribution upon authentication and active interaction with the display associated with the automobile; and an executable portion configured for blocking near field communication with the integrated secure edge device upon completion of the resource distribution.

11. The computer program product of claim 10, wherein displaying resource distribution information from the third party device and resource distribution elements from the integrated secure edge device to a display associated with the automobile, further comprises displaying prompts for user completion of the resource distribution including products, credits, or resource elements to complete resource distribution, and wherein the resource distribution information is displayed and appears similar to a third party display on the automobile display.

12. The computer program product of claim 10, wherein configuring resource distribution elements further comprises adding payment accounts to the integrated secure edge device to complete resource distributions or credits via contactless transacting using the integrated secure edge device associated with the automobile.

13. The computer program product of claim 10, wherein initiating contactless communication between the integrated secure edge device and the third party device further comprises recognizing a co-location between the integrated secure edge device and the third party device and creating a contactless near field communication linkage between the co-located devices.

14. The computer program product of claim 10, wherein initiating contactless communication between the integrated secure edge device and the third party device is based on a matching of restrictions and a matching of authentication credentials.

15. The computer program product of claim 10, wherein resource distribution elements comprise one or more resource accounts to complete a resource distribution.

16. A computer-implemented method for automobile contactless resource distribution, the method comprising:

providing a computing system comprising a computer processing device and a non-transitory computer readable medium, where the computer readable medium comprises configured computer program instruction code, such that when said instruction code is operated by said computer processing device, said computer processing device performs the following operations:

configuring resource distribution elements, authentication credentials, and restrictions into an integrated secure edge device associated with an automobile, wherein the integrated secure edge device associated with an automobile is within the automobile and generates a communication linkage between an automobile system and a third party device;

identifying a user co-located with the automobile system based on a communicable linkage between the automobile and a user device and at least one user automobile preference within the automobile,
  wherein the communicable linkage is based on a co-localization of the user device with the automobile, and
  wherein the at least one user automobile preference comprise at least one user specific vehicle adjustment comprising a seat adjustment, a climate adjustment, a mirror adjustment, or a radio adjustment;

authenticating the user co-located with the automobile system as an authenticated user based on the communicable linkage with the user device comprising an authenticated user device and based on the at least one user automobile preference matching at least one authenticated user automobile preference for the user co-located within the automobile;

initiating contactless communication between the automobile system via the integrated secure edge device and a third party device for completion of a resource distribution;

displaying resource distribution information from the third party device and resource distribution elements from the integrated secure edge device to a display associated with the automobile system, wherein the resource distribution information is transmitted from the third party device via the contactless communication between the integrated secure edge device and the third party device to the display associated with an automobile;

allowing user authorization of the resource distribution upon authentication and active interaction with the display associated with the automobile; and blocking near field communication with the integrated secure edge device upon completion of the resource distribution.

17. The computer-implemented method of claim 16, wherein displaying resource distribution information from the third party device and resource distribution elements from the integrated secure edge device to a display associated with the automobile, further comprises displaying prompts for user completion of the resource distribution including products, credits, or resource elements to complete resource distribution, and wherein the resource distribution information is displayed and appears similar to a third party display on the automobile display.

18. The computer-implemented method of claim 16, wherein configuring resource distribution elements further comprises adding payment accounts to the integrated secure edge device to complete resource distributions or credits via contactless transacting using the integrated secure edge device associated with the automobile.

19. The computer-implemented method of claim 16, wherein initiating contactless communication between the integrated secure edge device and the third party device further comprises recognizing a co-location between the integrated secure edge device and the third party device and creating a contactless near field communication linkage between the co-located devices.

20. The computer-implemented method of claim 16, wherein initiating contactless communication between the integrated secure edge device and the third party device is based on a matching of restrictions and a matching of authentication credentials.

\* \* \* \* \*